A. GALE.
Mower.

No. 17,964.

Patented Aug. 11, 1857.

UNITED STATES PATENT OFFICE.

ALANSON GALE, OF POUGHKEEPSIE, NEW YORK.

IMPROVEMENT IN MOWING-MACHINES.

Specification forming part of Letters Patent No. 17,964, dated August 11, 1857.

*To all whom it may concern:*

Be it known that I, ALANSON GALE, of Poughkeepsie, in the county of Dutchess and State of New York, have invented certain new and useful Improvements in Mowing-Machines; and I do hereby declare that the following is a full, clear, and exact description of the same, reference being had to the accompanying drawings, making a part of this specification, in which—

Figure 2:
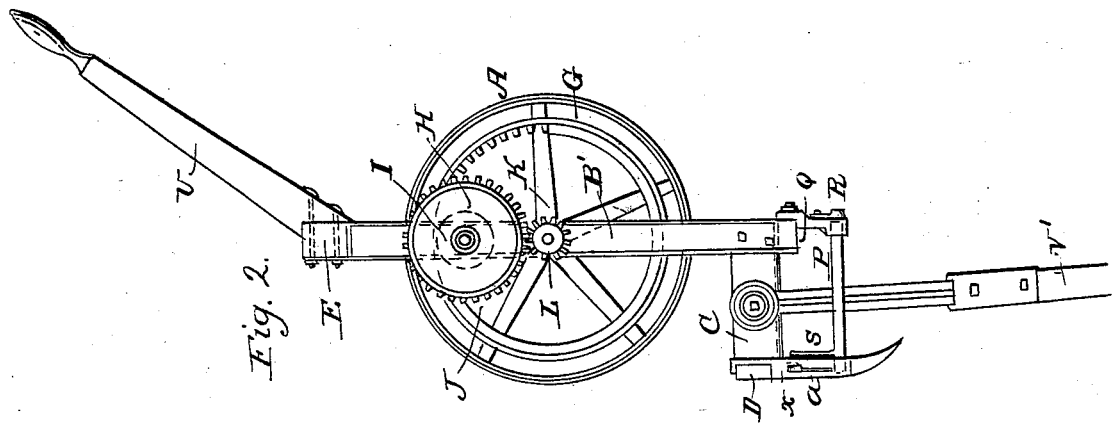
Figure 1:
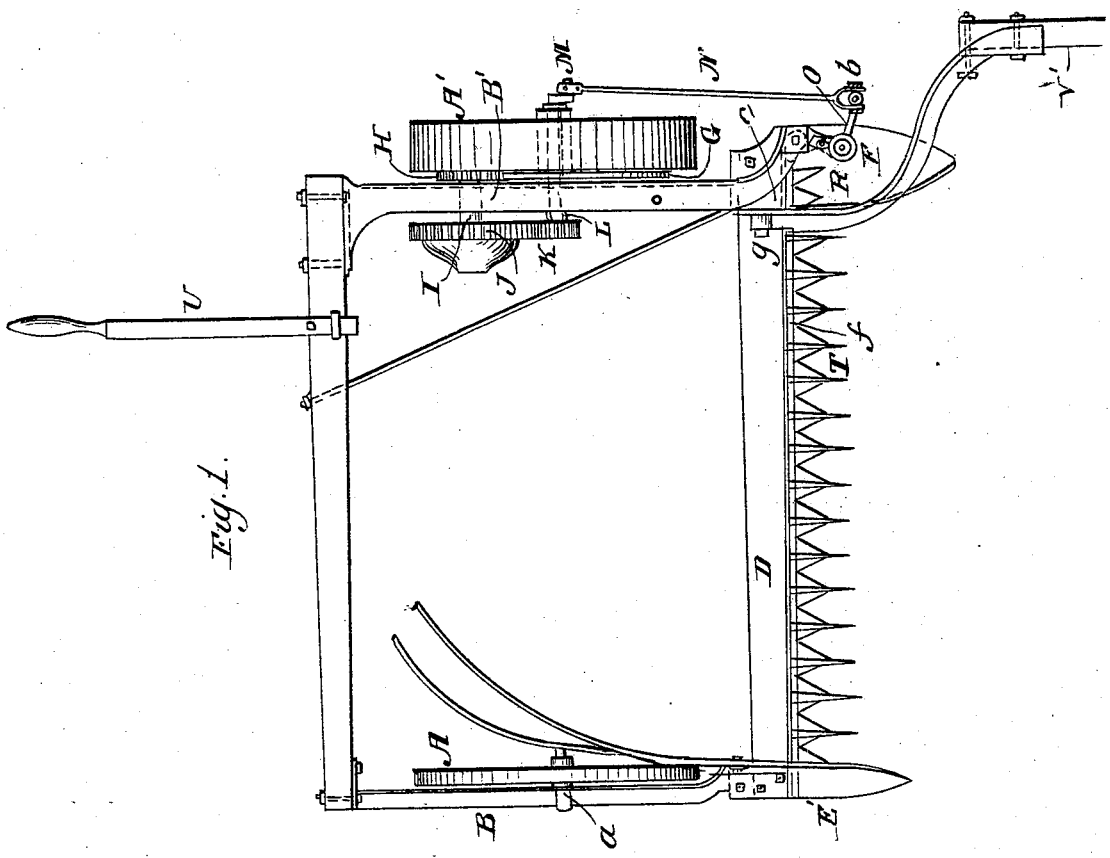
Figure 3:
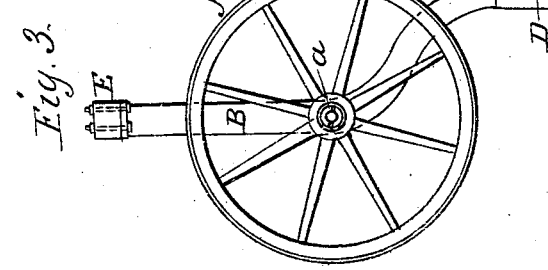

Figure 1 is a plan or top view. Fig. 2 is an inner side view of the improvement, showing the driving or master wheel and gearing. Fig. 3 is an inner view of the opposite side of the machine.

The nature of my improvement consists in so constructing and arranging mechanism consisting of simple spur-gear and a rock-shaft that the cutter-bar shall be operated by the driving or master wheel with greater advantages than heretofore. This I accomplish by passing the crank-shaft directly through the hollow axle of the driving-wheel and connecting it with an upright rock-shaft for giving motion to the cutter-bar, said rock-shaft admitting of being connected and disconnected with said cutter-bar (so as to admit of its withdrawal) without the removal of a pin or bolt.

To enable those skilled in the art to construct and use my improvements, I would describe the machine as follows:

A A' represent the wheels of the machine, A' being the driving-wheel. The axes of these wheels are attached to iron bars B B', the axis of A being attached to the inner side of the bar B, and the axis of the driving-wheel to the outer side of the bar B'. The latter axis must be hollow for the passage of the crank-axle. The bar B is of a curved form, as shown in Fig. 3; but the bar B' is straight, having a projection, C, depending from and attached to its front end.

D is the finger-bar, one end thereof attached to the front end of the curved bar B, and the opposite end to the lower end of the depending piece C. To the back ends of the bars B B' a cross-bar, E, is attached. To the front end of the bar B a shoe, E', is attached, while to the lower end of C a similar shoe, F, is attached, both shoes sliding upon the surface of the ground.

G is a rim-wheel having cogs on its inner edge. It is attached to the inner side of the driving-wheel A'.

H is a pinion meshing with G. It is hung on the outer end of shaft I, said shaft passing through and turning freely in the bar B'. On the inner end of shaft I is secured the toothed wheel J, which meshes into the pinion K, secured on the inner end of a shaft L, which passes through the bar B' and through the hollow axle of the driving or master wheel A'. This shaft L is shown in red lines in Fig. 1, and turns freely in the hollow axle. It carries on its outer end a crank, M.

N is a pitman rod having one end attached to M, and the other, by a universal joint, b, to the arm O of an upright rock-shaft, P. The lower end of this rock-shaft is stepped on the shoe F, while the upper end passes through a hole in the projection Q, attached to bar B'. The rock-shaft is prevented from rising by a swivel-button and plate R, when in place, bearing on the upper end of said shaft.

S is an arm projecting at right angles from near the lower end of the shaft P. It also stands at or near a right angle to the arm O at the upper end of the shaft.

X is a small pin secured firmly in the arm S, so as to rise and fall with the rock-shaft. It fits in a hole in a link connected with the end of the cutter-bar *f*.

T is the sickle or cutters.

To the rear cross-piece, E, a lever, V, is attached for raising the cutter-bar, if necessary, and V' is the tongue or pole, attached to the depending piece C by a bolt, *g*.

By my arrangement and construction of the gearing hereinbefore described, and the avoidance of all bevel-gear, the motion is communicated from the driving-wheel to the cutter-bar in a simple and direct manner with great firmness. Consequently the gearing is not liable to be deranged or broken, while by the mode of attaching the lower arm of the rock-shaft to the link of the cutter-bar it admits of the instant removal of the bar and cutters for sharpening simply by turning the holding-plate and button, so as to allow the raising of the rock-shaft and the detachment of the link.

Having described my improvements, what I claim as my invention, and desire to secure by Letters Patent, is—

Operating the cutter-bar *f* from the master-wheel A' by means of mechanism constructed and arranged in relation to the main frame and master-wheel of the machine, substantially in the manner described.

ALANSON GALE.

Witnesses:
JOHN F. CLARK,
JOHN S. HOLLINGSHEAD.